United States Patent
Naikwadi et al.

[11] Patent Number: 5,900,145
[45] Date of Patent: May 4, 1999

[54] LIQUID CRYSTAL STATIONARY PHASES FOR CHROMATOGRAPHY

[75] Inventors: Krishnat P. Naikwadi, Sydney, Canada; Prakash P. Wadgaonkar, Pune, India

[73] Assignee: J & K Environmental Ltd., Sydney, Canada

[21] Appl. No.: 08/916,377

[22] Filed: Aug. 22, 1997

[51] Int. Cl.$^6$ .................................................. B01D 15/08
[52] U.S. Cl. .................................. 210/198.2; 210/502.1; 210/635; 210/656; 95/88; 96/101
[58] Field of Search ................................. 210/635, 656, 210/198.2, 502.1; 95/88; 96/101; 502/402

[56] References Cited

U.S. PATENT DOCUMENTS

| | | | |
|---|---|---|---|
| 4,864,033 | 9/1989 | Bradshaw | 210/198.2 |
| 4,909,935 | 3/1990 | Bradshaw et al. | 210/198.2 |
| 4,913,836 | 4/1990 | East | 252/299.01 |
| 5,262,052 | 11/1993 | Rossiter | 210/198.2 |

OTHER PUBLICATIONS

Albrecht, I.D. et al., "A Polymeric Liquid Crystal Capillary Column for GC–MS Analysis of PCDD and PCDF," *J. High Resolution Chromatogr.* 14:143–146 (1991).

Apfel, M.A. et al., "Sythesis and Properties of High–Temperature Mesomorphic Polysiloxane Solvents: BiphenyL–Based Nematic Systems," *Anal. Chem.* 57:661–658 (1985).

Bradshaw, J.S. et al., "Synthesis and Chromatographic Properties of Polysiloxane //stationary Phases Containing Biphenylcarboxlate Ester Liquid–Chrystalline Side Groups," *J. Chromatogr.* 358:95–106 (1986).

Janini, G.M. et al., "Neat and Admixed Mesmorphic Polysiloxane Stationary Phases for Open–Tubular Column Gas Chromatography," *Anal. Chem.* 60:1119–1124 (1988).

Jones, B.A. et al., "Synthesis of Smectic Liquid–Crystalline Polysiloxanes from Biphenylcarboxlate Esters and Their Use as Stationary Phases for High–Resolution Gas Chromatography," *J. Org. Chem.* 49:4947–4951 (1984).

Markides, K.E. et al., "Smectric Biphenylcarboxlate Ester Liquid Crystalline Polysiloxane Stationary Phase for Capillary Gas Chromatography," *Anal. Chem.* 57:1296–1299 (1985).

Naikwadi, K.P. et al., "Liquid Crystals II. Applications of Liquid crystals as stationary phases in gas–liquid chromatography," *J. Chromatogr.* 206:361–367 (1981).

Naikwaidi, K.P. et al., "Synthesis of liquid crystalline polyacrylates and their use in capillary gas chromatography," *Makromol. Chem.* 187:1407–1414 (1986).

Naikwadi, K.P. et al., "Prospectives of polymmeric liquid crystal stationary phases for capillary column gas chromatographic separations," *Can J. Chem.* 65:970–975 (1987).

*Primary Examiner*—Ernest G. Therkorn
*Attorney, Agent, or Firm*—Sterne, Kessler, Goldstein & Fox P.L.L.C.

[57] ABSTRACT

The present invention relates to liquid crystalline alkenes and liquid crystalline polysiloxanes prepared from these alkenes. More precisely, the present invention is related to the development of fused ring aromatic-containing side chain liquid crystal polysiloxanes (SCLCP). These liquids crystalline polysiloxanes are particularly useful as the stationary phase in column chromatography for the separation of various isomeric compounds, including polychlorinated dibenzo-p-dioxins (PCDD), polychlorinated diberizofurans (PCDF), polycyclic aromatic hydrocarbons (PAH), polychlorinated biphenyls (PCB) and polysubstituted benzenes.

14 Claims, 4 Drawing Sheets

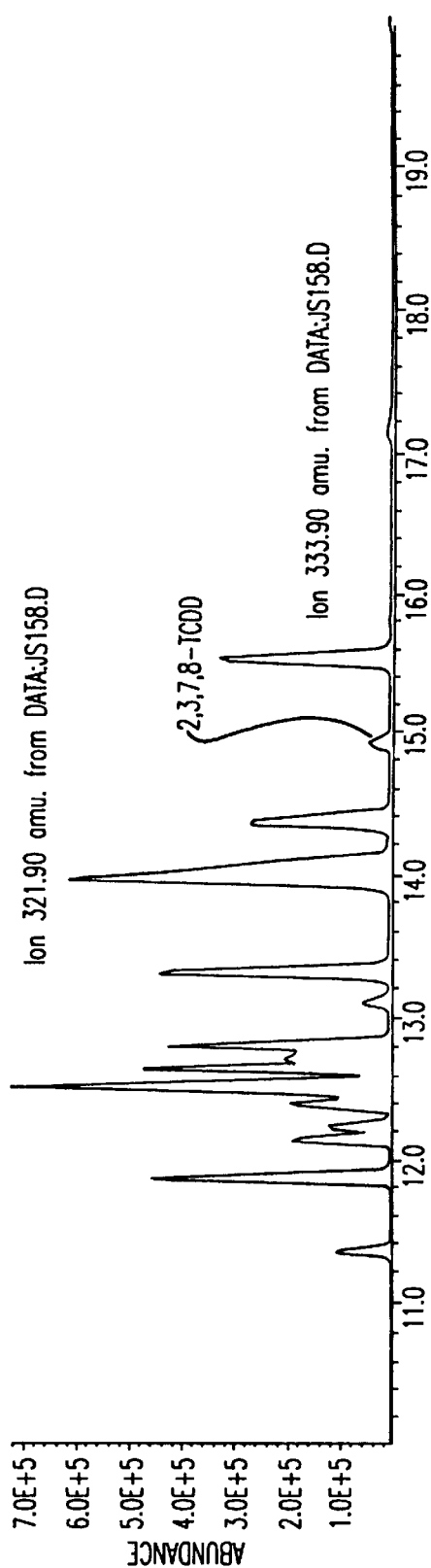
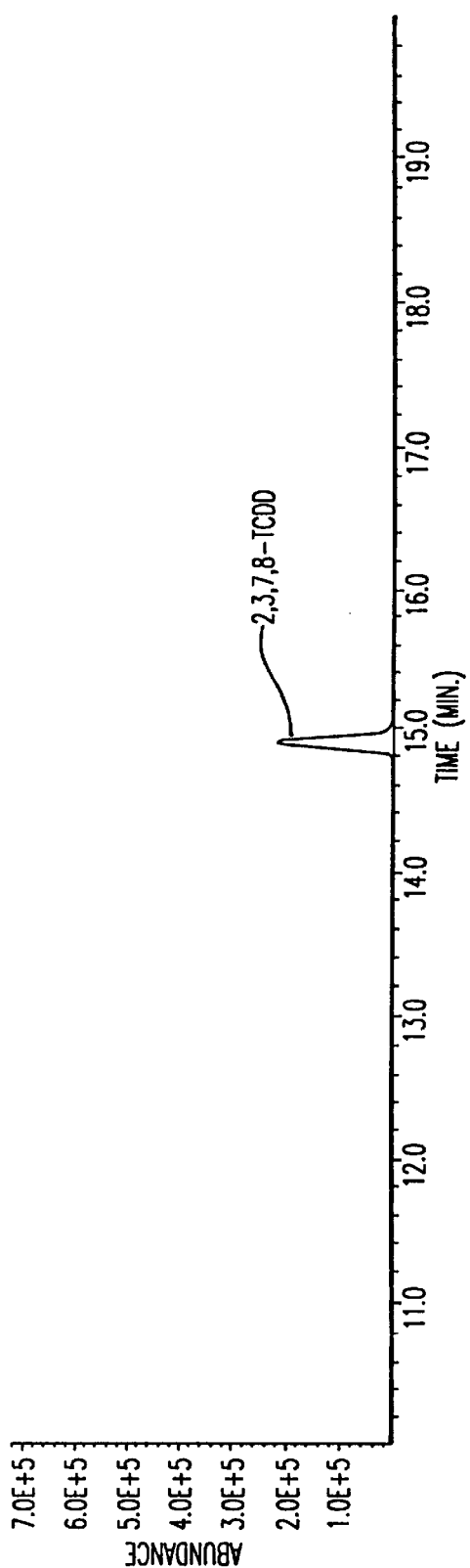

LIQUID CRYSTAL STATIONARY PHASES FOR CHROMATOGRAPHY

FIELD OF THE INVENTION

The present invention relates to liquid crystalline alkenes and liquid crystalline polysiloxanes prepared from these alkenes. More precisely, the present invention is related to the development of fused ring aromatic-containing side chain liquid crystal polysiloxanes (SCLCPs). These liquid crystalline polysiloxanes are particularly useful as the stationary phase in column chromatography for the separation of various isomeric compounds, including polychlorinated dibenzo-p-dioxins (PCDD), polychlorinated dibenzofurans (PCDF), polycyclic aromatic hydrocarbons (PAH), polychlorinated biphenyls (PCB) and polysubstituted benzenes.

BACKGROUND OF THE INVENTION

Very long capillary columns (i.e., >60 m) containing conventional stationary phases are useful for the separation of a large number of environmentally important compounds having different volatilities. Separation of various isomers of a compound, however, particularly isomers having similar volatilities, is very difficult using these capillary columns containing conventional stationary phases.

Liquid crystal compounds have shown particular selectivity and sensitivity as stationary phases for the separation of isomers having similar volatilities. Since the initial discovery of this property, research has been directed at the development of liquid crystalline compounds exhibiting broad liquid crystalline temperature ranges (i.e. broad phase transition temperature ranges), higher column operating temperatures, and lower bleed (i.e. loss of mobile phase).

Studies have also been undertaken to determine the correlation between the separation of positional isomers of a compound (e.g meta- and para-substituted benzene) and the structure of the liquid crystalline compounds used as the stationary phases. See K. Naikwadi et al., *Can. J Chem.*, 65:970 (1987). These studies have shown that the separation factor for a particular pair of isomers is dependent on the chemical structure of the liquid crystalline compound used as stationary phase. This correlation between structure and separation provided very important clues for the development of specific liquid crystalline compounds to be used in chromatographic separation of isomers of a compound.

Although conventional stationary phases have proven unsatisfactory to date, the separation of isomers having similar volatilities can be achieved with capillary or packed column gas chromatography using stationary phases composed of liquid crystalline polymers (LCPs). For a LCP to be useful as the stationary phase in chromatography, the LCP must exhibit high thermal stability, broad liquid crystalline temperature range, and high upper transition temperature. Optimal performance depends on additional factors, such as the structure of the mesogenic group (i.e. the side chain of the LCP), the degree of polymerization, the packing of the side chains of the LCP, and the procedure used to prepare the columns.

Liquid crystal polymers known to be useful as stationary phases for chromatography are based on either a phenyl carboxylate ester or biphenyl carboxylate ester. The performance of these side chain liquid crystalline polysiloxanes (SCLCPs) as stationary phases, however, is not completely satisfactory. For example, known SCLCPs exhibit low column stability due to their volatility as well as longer retention times (and, concomitantly, lower efficiency) for polyaromatic hydrocarbon samples due to the low effective temperature limit of the columns. Thus, there is a need in the art for SCLCPs exhibiting a broad liquid crystalline temperature range for use in highly stable, efficient and selective capillary columns.

Moreover, the toxicity assessment of any environmental sample containing isomeric compounds requires separation of all the isomeric components thereof. For example, in polychlorinated dibenzo-p-dioxins, 2,3,7,8-tetrachlorodibenzo-p-dioxin ($T_4CDD$) is the most toxic isomer. The separation of 2,3,7,8-$T_4CDD$ from the other 21 $T_4CDD$ isomers is essential to determine the toxicity of a particular sample. Similarly, in the case of furans the separation of 2,3,7,8-tetrachlorodibenzofuran (2,3,7,8-$T_4CDF$) is required from the other 37 $T_4CDF$ isomers. Limited success has been achieved using known polymeric liquid crystal columns (see, e.g., U.S. Pat. No. 4,909,935) to separate these various isomers. Thus, there is a need in the art for capillary columns useful in the separation of isomers of toxic compounds, particularly compounds such as PCDD and PCDF.

SUMMARY OF THE INVENTION

Accordingly, it is an object of the present invention to provide side chain liquid crystal polymers containing a fused-ring aromatic moiety. It is also an object of the present invention to provide SCLCPs containing a naphthalene moiety for use in chromatographic separation of environmentally important structural isomers. It is further an object of the present invention to provide stationary phases that are suitable for use in preparing highly efficient and stable columns for chromatography, particularly for the separation of multiple isomers of organic compounds. Other objects, features and advantages of the present invention will be set forth in the detailed description of preferred embodiments that follows, and in part will be apparent from the description or may be learned by practice of the invention.

Thus, in a first embodiment, the present invention relates to liquid crystalline compounds of the following formula (I):

Formula (I)

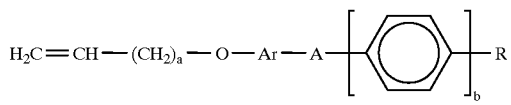

wherein: Ar is 2,6-naphthyl or 4,4'-diphenylene; A is —COO— or —OOC—; a is an integer of from 1 to 10; b is an integer of 1 or 2; and R is any group which maintains the liquid crystalline properties of the resultant compound, preferably alkyl having from 1 to 12 carbon atoms, alkoxy having 1 to 12 carbon atoms, or carboxyalkyl having 2 to 13 carbon atoms; provided that Ar is not 4,4'-diphenylene when A is —COO—.

In a second embodiment, the present invention relates to polysiloxanes derived from the liquid crystalline compounds represented by formula (1), thus forming SCLCP of the following formula (II):

Formula (II)

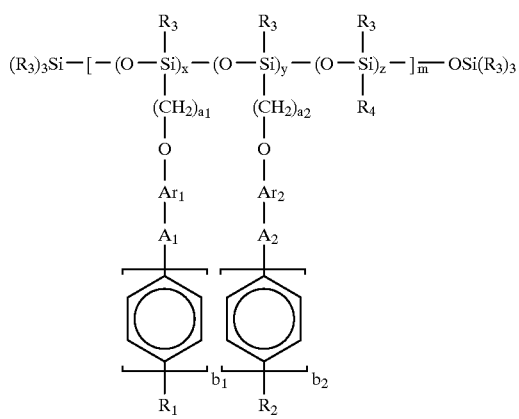

wherein: $Ar_1$ and $Ar_2$ are each independently 2,6-naphthyl or 4,4'-diphenylene; $A_1$ and $A_2$ are each independently —COO— or —OOC—; $a_1$ and $a_2$ are each independently an integer of from 3 to 12; $b_1$ and $b_2$ are each independently an integer of 1 or 2; $R_1$ and $R_2$ are each independently any group which maintains the liquid crystalline properties of the resultant compound, preferably alkyl having from 1 to 12 carbon atoms, alkoxy having 1 to 12 carbon atoms, or carboxyalkyl having 2 to 13 carbon atoms; each $R_3$ is independently n-alkyl having from 1 to 18 carbon atoms, phenyl or 4,4'-diphenylene; $R_4$ is n-alkyl having from 1 to 18 carbon atoms, phenyl or 4,4'-diphenylene; m is an integer of from 10 to 200; and x, y and z are each an integer of from 10 to 100, such that x+y+z=m; provided that $Ar_1$ and $Ar_2$ are not both 4,4'-diphenylene when $A_1$ and $A_2$ are both —COO—.

In a third embodiment, the present invention relates to a method of making polysiloxanes of the formula (II) which comprises reacting a polyalkylhydrosiloxane with an alkene (or alkenes) of the formula (I) in the presence of a suitable catalyst.

In a fourth embodiment, the present invention relates to the use of polysiloxanes of the formula (II) as the stationary phase in column chromatography. In view of the principle of "like dissolves like," it has been found that the inventive side chain liquid crystal polymers are useful for the separation of structural isomers of a great variety of environmentally important compounds, including PCDD, PCDF, PAH, PCB and polysubstituted benzenes.

In a fifth embodiment, the present invention relates to the use of polysiloxanes of the formula (II) in electronic display devices.

BRIEF DESCRIPTION OF THE FIGURES

FIG. 2. Separation of 2,3,7,8-tetrachlorodibenzo-p-dioxin ($T_4CDD$) from other tetrachloro-isomers using a column made in accordance with the present invention.

A: Mass chromatograms of M+2 ion (m/z=321.9) of $T_4CDD$ for a synthetic mixture of polychlorinated dibenzo-p-dioxins.

B: Mass chromatograms of M+2 ion (m/z=333.9) of $T_4CDD$ for a $^{13}C$-labeled 2,3,7,8-$T_4$ CDD isomer.

Figure 3A:
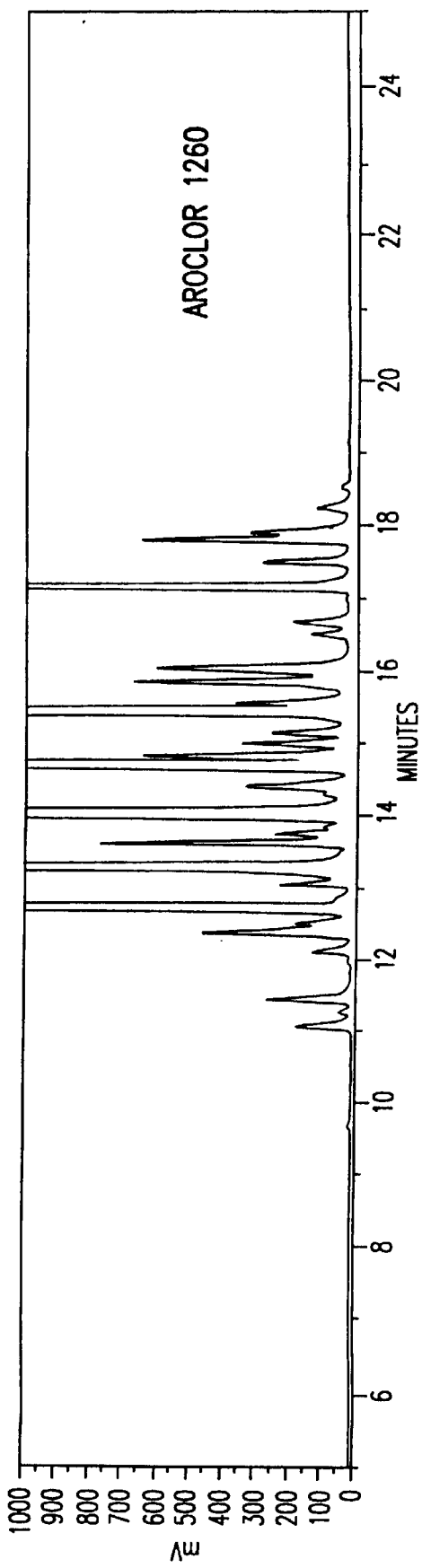
Figure 3B:
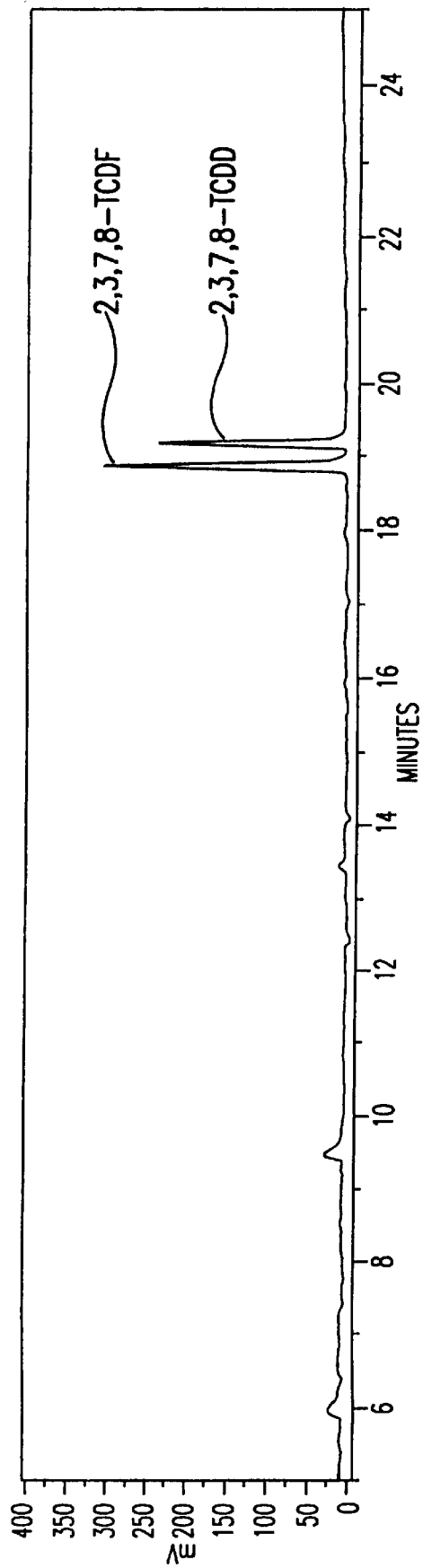

FIG. 3. Separation of polychlorinated biphenyls (Aroclor 1260) from 2,3,7,8-TCDD/TCDF isomers using a column made in accordance with the present invention.

A: GC-ECD chromatogram of Aroclor 1260.

B: GC-ECD chromatogram of 2,3,7,8-$T_4CDD/T_4CDF$

Figure 4A:
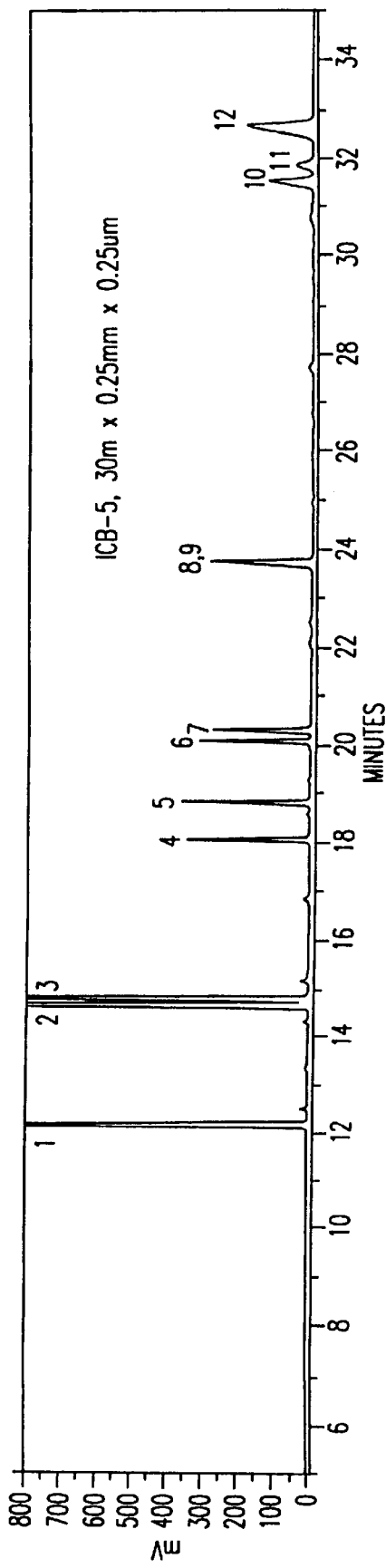
Figure 4B:
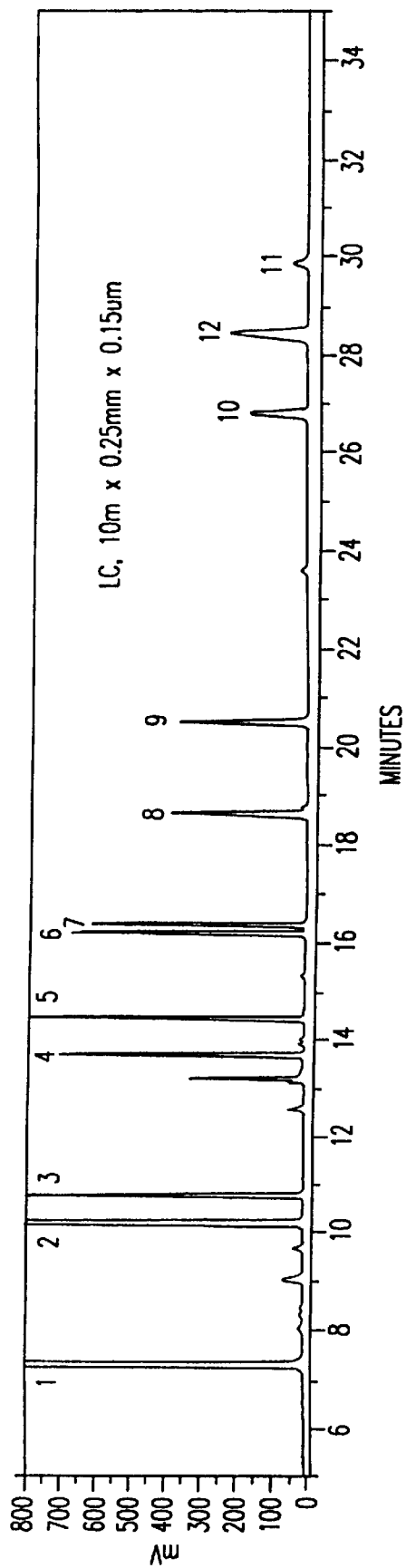

FIG. 4. Separation of polycyclic aromatic hydrocarbons using a column made in accordance with the present invention.

DETAILED DESCRIPTION OF PREFERRED EMBODIMENTS

A first preferred embodiment of the present invention is directed to liquid crystal alkenes of the following formula (I):

Formula (I)

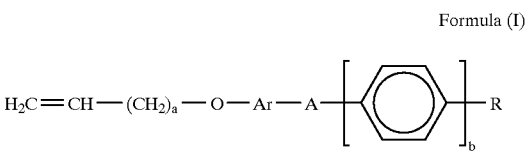

wherein

Ar is 2,6-naphthyl or 4,4'-diphenylene;

A is —COO— or —OOC—;

a is an integer of from 1 to 10;

b is an integer of 1 or 2; and

R is any group which maintains the liquid crystalline properties of the resultant compound;

provided that Ar is not 4,4'-diphenylene when A is —COO—.

Preferably, R is alkyl having from 1 to 12 carbon atoms, alkoxy having 1 to 12 carbon atoms, or carboxyalkyl having 2 to 13 carbon atoms. More preferably, a is 1 and Ar is 2,6-naphthyl.

The liquid crystalline alkenes of the formula (I) can be made using any of the methods and techniques known to those skilled in the art.

In a particularly preferred embodiment, liquid crystalline alkenes of the formula (1) in which Ar is 2,6-naphthyl and A is —COO— are prepared according to the following Scheme 1:

Scheme 1

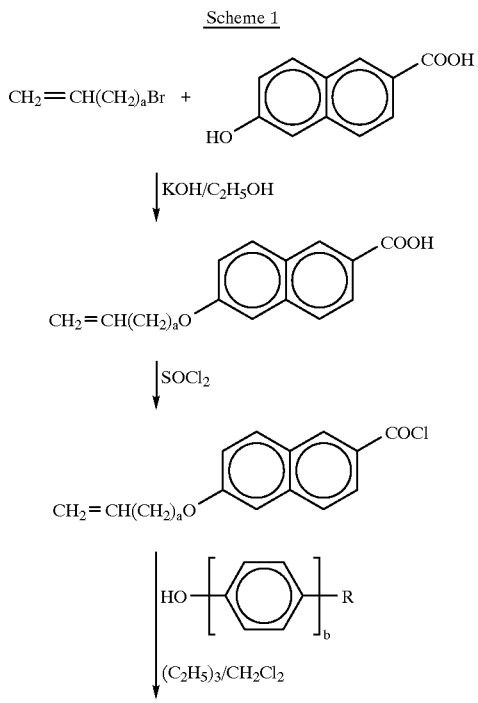

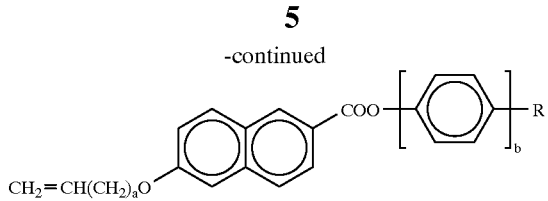

In another particularly preferred embodiment, liquid crystalline alkenes of the formula (I) in which Ar is 2,6-naphthyl and A is —OOC— are prepared according to the following Scheme 2:

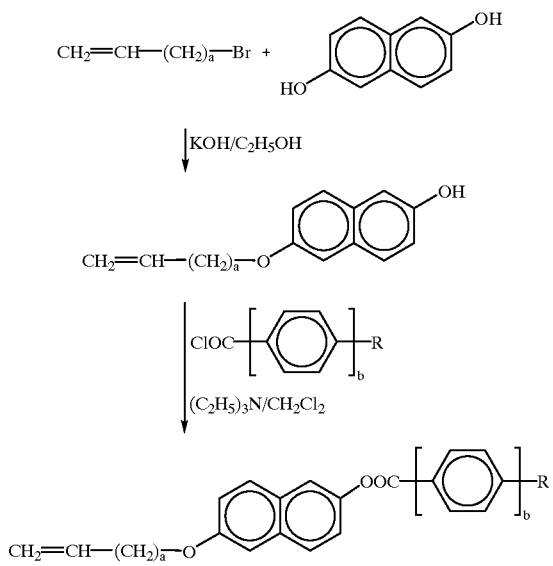

In yet another particularly preferred embodiment, liquid crystalline alkenes of the formula (I) in which Ar is 4,4'-biphenylene and A is —OOC— are prepared according to the following Scheme 3:

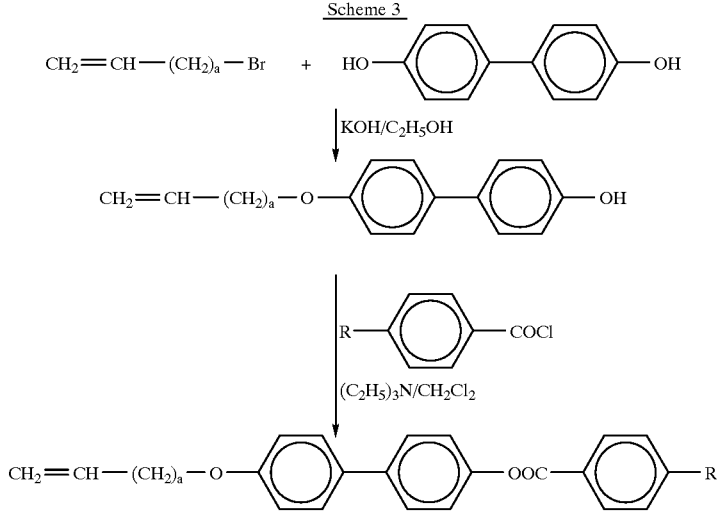

Particularly preferred compounds of the formula (1) include, but are not limited to, 4-ethoxy(6-allyloxynaphthyl-2-carbonyloxy) biphenylene-4'-carboxylate; 4-ethoxy[6-(3-butene-1-yloxy)naphthyl-2-carbonyloxy] biphenylene-4'-carboxylate; 4-ethoxy[6-(4-pentene-1-yloxy)naphthyl-2-carbonyloxy] biphenylene-4'-carboxylate; 4-ethoxy[6-(5-hexene-1-yloxy)naphthyl-2-carbonyloxy] biphenylene-4'-carboxylate; 4-ethoxy[6-(10-undecene-1-yloxy)naphthyl-2-carbonyloxy] biphenylene-4'-carboxylate; 4-ethoxyphenyl-6-(allyloxy)naphthyl-2-carboxylate; 4-ethoxyphenyl-6-(3-butenyloxy)naphthyl-2-carboxylate; 4-ethoxyphenyl-6-(4-pentenyloxy)naphthyl-2-carboxylate; 4-ethoxyphenyl-6-(5-hexenyloxy)naphthyl-2-carboxylate; 4-ethoxyphenyl-6-(10-undecenyloxy)naphthyl-2-carboxylate; 4-(S)-2-methyl-1-butyl (6-allyloxynaphthyl-2-carbonyloxy) biphenyl-4'-carboxylate; 4-(S)-2-methyl-1-butyl-[6(3-butene-1-yloxy) naphthyl-2-carbonyloxy] biphenyl-4'-carboxylate; 4-(S)-2-methyl-1-butyl-[6(4-pentene-1-yloxy)naphthyl-2-carbonyloxy] biphenyl-4'-carboxylate; 4-(S)-2-methyl-1-butyl-[6(5-hexene-1 -yloxy)naphthyl-2-carbonyloxy] biphenyl-4'-carboxylate; 4-(S)-2-methyl-1-butyl-[6(1 0-undecene-1-yloxy)naphthyl-2-carbonyloxy] biphenyl-4'-carboxylate; 6-hexenyloxynaphthyl-2-yl4(4-ethoxyphenyl) benzoate; 6-hexenyloxynaphthyl-2-yl 4-ethoxy benzoate; and 4'-butenyloxybiphenyl-4-yl-4-ethoxybenzoate.

A second preferred embodiment is directed to liquid crystal polysiloxanes of the following formula II):

Formula (II)

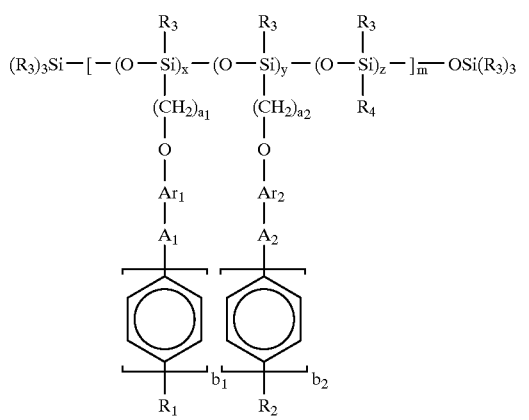

wherein:

Ar₁ and Ar₂ are each independently 2,6-naphthyl or 4,4'-diphenylene;

A₁ and A₂ are each independently —COO— or —OOC—;

a₁ and a₂ are each independently an integer of from 3 to 12;

b₁ and b₂ are each independently an integer of 1 or 2;

R₁ and R₂ are each independently any group which maintains the liquid crystalline properties of the resultant compound;

each R₃ is independently n-alkyl having from 1 to 18 carbon atoms, phenyl or 4,4'-diphenylene;

R₄ is n-alkyl having from 1 to 18 carbon atoms, phenyl or 4,4'-diphenylene;

m is an integer of from 10 to 200; and x, y and z are each an integer of from 10 to 100, such that x+y+z=m;

provided that Ar₁ and Ar₂ are not both 4,4'-diphenylene when A₁ and A₂ are both —COO—.

Preferably, each R₃ is lower alkyl (i.e., alkyl having from 1 to 6 carbon atoms)or phenyl. More preferably, each R₃ is methyl.

Preferably, R₄ is n-alkyl.

Preferably, R₁ and R₂ are each independently alkyl having from 1 to 12 carbon atoms, alkoxy having 1 to 12 carbon atoms, or carboxyalkyl having 2 to 13 carbon atoms. More preferably, R₁ and R₂ are the same and each is alkoxy or carboxyalkyl.

In a first particularly preferred embodiment, A₁ and A₂ are the same. More preferably, Ar₁ and Ar₂ are also the same. Most preferably, Ar₁ and Ar₂ are each 2,6-naphthyl.

In another particularly preferred embodiment A₁ and A₂ are different. More preferably, Ar₁ and Ar₂ are the same. Most preferably, Ar₁ and Ar₂ are each 2,6-naphthyl.

Particularly preferred examples of polysiloxanes of the formula (II) include, but are not limited to, Examples 1EP–18EP and 19ECP–23ECP, described below.

The liquid crystal polysiloxanes of formula (II) of the present invention may also be prepared according to any of the methods known to those skilled in the art. In a particularly preferred embodiment, polysiloxanes of the formula (II) in which each R₃ is methyl are prepared according to the following Scheme 4:

Scheme 4

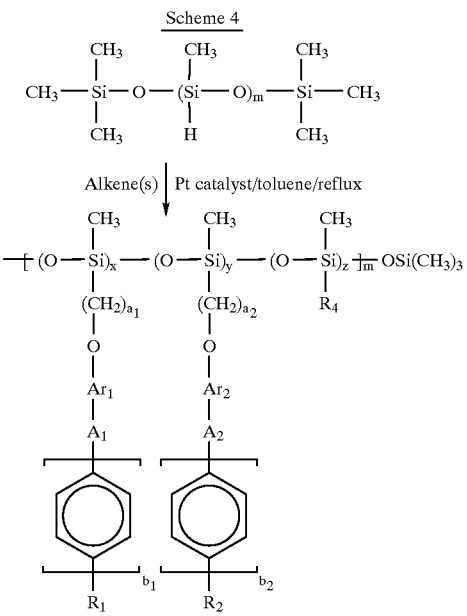

The liquid crystal compounds of formula (I) and formula (II) may be used in any suitable application known to those skilled in the art. Illustrative applications of liquid crystal compounds include, but are not limited to, electronic display devices (such as calculators, electronic clocks, data output equipment, traffic signals, advertising displays, electrical tuning indicators, industrial control systems, and UV and/or X-ray image converters; see, e.g., U.S. Pat. No. 4,913,836) and column chromatography.

With respect to the latter use, as described above, the commonly used stationary phases in gas chromatography are inadequate for the analysis of close boiling isomeric organic compounds. Isomeric organic compounds have wide differences in their toxicity and assessment of environmental samples for their toxicity varies depending upon the amount of the toxic isomers present in a particular sample. For the real assessment of toxicity of an environmental sample, it is essential to quantify the most toxic isomers/compounds accurately. Also, biological activity of isomeric compounds varies and determination of active isomer is very important.

Accordingly, a third preferred embodiment of the present invention is directed to the use of liquid crystalline compounds, both alkenes of the formula (I) and polysiloxanes of the formula (II), as the stationary phase for column chromatography. The inventive liquid crystalline compounds are particularly useful in the separation of isomers of aromatic hydrocarbons, particularly halogenated aromatic hydrocarbons and polycyclic aromatic hydrocarbons.

The use of known liquid crystalline compounds in such application is described, for example, in U.S. Pat. Nos. 4,909,935; 4,913,836; Apfel et al., Anal. Chem. 57:651 (1985); Naikwadi et al., Can. J. Chem. 65:970 (1987); Naikwadi et al., J. Chromatogr. 206:361 (1981); Jones et al., J. Org. Chem. 49:4947 (1984); Markides et al., Anal. Chem. 57:1296 (1985); Bradshaw et al., J. Chromatogr. 358:95 (1986); Naikwadi et al., Macromol. Chem. 187:1407 (1987); Janini et al., Anal. Chem. 60:1119 (1988); and Albrecht et al., J. High Resolution Chronatogr. Chromatogr. Commun. 14:147 (1991). The inventive polysiloxanes exhibit superior qualities in chromatography applications when compared to these known liquid crystalline compounds.

Preferably, the inventive liquid crystalline compounds are employed as the stationary phase for gas chromatography.

These compounds can, however, also be used as the stationary phase in supercritical fluid chromatography and high performance liquid chromatography.

The inventive liquid crystalline compounds can be used alone as the stationary phase in chromatography, or can be coated on solid supports.

The following examples are illustrative only and are not intended to limit the scope of the invention as defined by the appended claims. It will be apparent to those skilled in the art that various modifications and variations can be made in the methods of the present invention without departing from the spirit and scope of the invention. Thus, it is intended that the present invention cover the modifications and variations of this invention provided they come within the scope of the appended claims and their equivalents.

All patents and publications referred to herein are expressly incorporated by reference.

EXAMPLES

The following compounds A–L were prepared and used to make the liquid crystalline alkenes 1E–18E in Table 1.

Preparation of 6-(allyloxy)naphthyl-2-Carboxylic Acid (A)

6-Hydroxy-2-naphthoic acid (3.75 g, 20 mol) was added to a solution of potassium hydroxide (2.45 g, 22 mmol) and potassium iodide (0.2 g) in 90% ethanol (100 ml). The solution was refluxed for 1 hour and allyl bromide (2.66 g, 22 mmol) was added dropwise over a period of 2 hours. The reflux was continued for 20 hours, then cooled to room temperature and 100 mL water was added. The solution was acidified with dilute hydrochloric acid. The precipitate was filtered, washed with water, and then recrystallized from acetic acid. Yield 3.24 g (71%) and mp. 158° C.

Using above procedures following 6-(ω-alkenyloxy) naphthyl-2-carboxylic acids were prepared using the corresponding ω-alkenyl bromides.

| ACIDS | Yield | M.P. (C.°) |
|---|---|---|
| 6-(3-Butene-1-yloxy)naphthyl-2-carboxylic acid (B) | 50 | 180 |
| 6-(4-Penten-1-yloxy)naphthyl-2-carboxylic acid (C) | 51 | 144 |
| 6-(5-Hexen-1-yloxy)naphthyl-2-carboxylic acid (D) | 74 | 134 |
| 6-(1-Undecen-1-yloxy)-2-carboxylic acid (E) | 59 | 177 |

Preparation of (S)-2-methyl-1-butyl 4-(4-hydroxyphenyl)benzoate (F)

A mixture of 4-(4-hydroxyphenyl) benxoic acid (4.05 g, 18.9 mmol), (S)-2-methyl-1-butanol(5 g, 56.5 mmol), sulphuric acid (0.10 g) and benzene (30 ml) was refluxed through a water separator (Dean Stark apparatus). After 2 days, complete dissolution of the acid was observed. The reaction mixture was cooled, ether (100 ml) was added and the solution was extracted twice with 10-ml portions of 5% aqueous sodium bicarbonate. The organic phase was dried over anhydrous sodium sulphate, the ether was removed, and the product was recrystallized from methanol, yield 80%, m.p. 110–112° C.

Preparation of 4'-ethoxybiphenyl-4-ol (G)

4,4'-Dihydroxybiphenyl (1 1.18 g, 60 mml) was dissolved into a 10% aqueous sodium hydroxide solution (60 ml, 150 mmol) under cooling. To this solutions added dropwise diethl sulphate (9.25 g, 60 mmol) over a period of 2 hours at room temperature. The reaction was allowed to proceed further for 5 hours, formed solid was separated by suction and heated in a 10% sodium hydroxide solution (20 ml). Formed solid upon cooling was collected by filtration and again dissolved in boiling water (300 ml). The solution was filtered while hot and the filtrate was acidified with 20% hydrochloric acid at 70° C. Formed solid on cooling was collected and purified by recrystallization from ethanol. Yield 48%, m.p. 140° C.

Using the same procedures 4-ethoxyphenol (H) was also synthesized, yield 73%, m.p. 66° C.

Preparation of 4'-butenyloxybiphenyl-4-ol (I)

A solution containing 4,4'-Dihydroxybiphenyl (5 g,26.75 mmol), KOH (1.65 g, 29.5 mmol) and methanol (50 ml) was refluxed for 2 hours. 4-Bromo-1-butene (3.975 g, 29.5 mmol) in methanol (10 ml) was added dropwise over a period of 2 hours to the refluxing reaction mixture. The refluxation was continued for 24 hours. The solvent was then removed. The product was then extracted by dichloromethane (50 ml) and dichloromethane was then removed. The resulting solid was washed with 10% potassium hydroxide solution (17 ml), filtered and recrystallized from ethanol: water (1.1 v/v) mixture. Yield 12%, m.p. 155–157° C.

Preparation of 6-(5-hexen-1-yloxy)naphthyl-2-ol (J)

A solution containing 2,6-dihyroxynaphtylene (5.16 g, 0.032 mol). KOH (1.55 g, 0.039 mol) and methanol (100 ml) was refluxed for 1 hour. To the resulting solution was added 6-bromo-1-hexene (5.45 g, 0.033 mol) over a period of 2 hours. The reaction mixture was further refluxed for 12 hours. The solvent was then removed. The product was then extracted by dichloromethane (200 ml) and dichloromethane was then removed. The resulting solid was chromatographed in silica gel using dichloromethane/hexane (2:1, v/v) as eluent.
Yield 13%, m.p. 77° C.

Preparation of 4[4-(ethoxy)phenyl]Benzoic Acid (K)

4-(4-Hydroxyphenyl)benzoic acid (2.5 g, 11.75 mmol) was added to a solution of KOH (1.5 g, 26.78 mmol) in 90% ethanol (50 ml). The solution was refluxed for 60 minutes and diethl sulphate (1.81 g, 11.75 mmol) was added dropwise over a period of 2 hours. The refluxation was continued for 16 hours. The solution was cooled, poured into water (200 ml), and acidified with dilute hydrochloric acid. The precipitate was filtered, washed with water and then recrystallized from acetic acid. Yield 55%, m.p. 220° C.

Using the same procedure, 4-ethoxybenzoic acid (L), was prepared, yield 60%, m.p. 198° C.

Examples 1E–18E

All the alkenes listed in Table I were synthesized by the same procedure, of which the following synthesis of compound 1E is an example:

Preparation of 4-ethoxy(6-allyloxynaphthyl-2-carbonyloxy) biphenylene-4'-carboxylate (1E)

6-(Allyloxy)naphthyl-2-carboxylic acid (2.28 g, 10 mmol) and thionyl chloride (6 ml) containing a drop of dimethyl formamide was reacted in a round bottom flask equipped with a hydrochloric acid absorber at room temperature until the solution become clear (ca. 6 hours). The temperature was raised to 45° C. for 30 minutes to ensure completion of reaction. The excess thionyl chloride was removed on a rotary evaporator under reduced pressure. The product was dissolved in dichloromethane (5 ml) and this solution was added dropwise to a mixture of 4'-ethoxybiphenyl-4-ol (2.14 g, 10 mmol) and triethylamine (1.52 g, 15 mmol) in dichloromethane (25 ml), in an ice water bath. After the mixture was stirred for 12 hours at room temperature, dichloromethane and triethylamnine were removed on a rotary evaporator under reduced pressure. The residue was dissolved in dichloromethane (25 ml), washed with saturated aqueous sodium bicarbonate (2×10 ml), and with water (2×10 ml). Then dichloromethane layer was dried over sodium sulphate, filtered, and the dichloromethane layer was removed on a rotary evaporator. The crude product was dissolved in dichloromethane and passed through a silica gel column. The solvent was removed on a rotary evaporator. The product was recrystallized from a mixture of dichloromethane and ethanol. Yield of 1E, 61%.

Using this procedure, the following liquid crystalline alkenes of the formula (I) (in which Ar is 2,6-naphthyl and A is —COO—) were synthesized according to Scheme 1:

Example 2E: 4-Ethoxy[6-(3-butene-1-yloxy)naphthyl-2-carbonyloxy] biphenylene-4'-carboxylate;

Example 3E: 4-Ethoxy[6-(4-pentene-1-yloxy)naphthyl-2-carbonyloxy] biphenylene-4'-carboxylate;

Example 4E: 4-Ethoxy[6-(5-hexene-1-yloxy)naphthyl-2-carbonyloxy] biphenylene-4'-carboxylate (4E); and Example 5E: 4-Ethoxy[6-(10-undecene-1-yloxy)naphthyl-2-carbonyloxy] biphenylene-4'-carboxylate.

Preparation of 4-ethoxyphenyl-6-(allyloxy)naphthyl-2-carboxylate (6E)

For this example, the alkenes were made according with the procedures used with Example 1E above, with the following exception: 4-ethoxyphenyl was used instead of 4'-ethoxybiphenyl-4-ol.

Using this procedure, the following liquid crystalline alkenes designated as Examples 7E to 10E of formula (I) (in which Ar is 2,6-naphthyl and A is —COO—) were synthesized according to Scheme 1:

Example 7E: 4-Ethoxyphenyl-6-(3-butenyloxy)naphthyl-2-carboxylate;

Example 8E: 4-Ethoxyphenyl-6-(4-pentenyloxy)naphthyl-2-carboxylate;

Example 9E: 4-Ethoxyphenyl-6-(5-hexenyloxy)naphthyl-2-carboxylate; and

Example 10E: 4-Ethoxyphenyl-6-(10-undecenyloxy)naphthyl-2-carboxylate.

Preparation of 4-(S)-2-methyl-1-butyl (6-allyloxynaphthyl-2-carbonyloxy) biphenyl-4'-carboxylate (11E)

For this example, the alkenes were made according to the procedure used for Example 1E above, with the following exception: (S)-2-Methyl-1-butyl 4-(4-hydroxyphenyl) benzoate was used instead of 4'-ethoxybiphenyl-4-ol.

Using these procedures liquid crystalline alkenes designated as Examples 12E to 15E of formula 1 (in which Ar is 2,6-naphthyl and A is —COO—) were synthesized according to Scheme 1:

Example 12E: 4-(S)-2-Methyl-1-butyl-[6(3-butene-1-yloxy) naphthyl-2-carbonyloxy] biphenyl-4'-carboxylate;

Example 13E: 4-(S)-2-Methyl-1-butyl-[6(4-pentene-1-yloxy)naphthyl-2-carbonyloxy] biphenyl-4'-carboxylate;

Example 14E: 4-(S)-2-Methyl-1-butyl-[6(5-hexene-1-yloxy)naphthyl-2-carbonyloxy] biphenyl-4'-carboxylate; and Example 15E: 4-(S)-2-Methyl-1-butyl-[6(1 0-undecene-1-yloxy)naphthyl-2-carbonyloxy] biphenyl-4'-carboxylate.

Preparation of 6-hexenyloxynaphthyl-2-yl 4(4-ethoxyphenyl) benzoate (16E)

6-Hexenyloxynaphthyl-2-ol and 4-(4-ethoxyphenyl) benzoic acid were reacted to prepare 6-hexenyloxynaphthyl-2-yl 4-(4-ethoxyphenyl) benzoate (16E) (in which Ar is 2,6-naphthyl and A is —OOC—) according to the procedure used for Example 1E above.

Using this same procedure and 4-ethoxy benzoic acid instead of 4(4-ethoxyphenyl) benzoic acid, 6-hexenyloxynaphthyl-2-yl 4-ethoxy benzoate (17E) was prepared.

Preparation of 4'-butenyloxybiphenyl-4-yl-4-ethoxybenzoate (18E)

Using the procedure used for example 1 7E and 4'-butenlyoxybiphenyl-4-ol instead of 6-hexenyloxynapthyl-2-ol, 4'-butenyloxybiphenyl-4-yl-4-ethoxybenzoate (18E) was prepared (in which Ar is 4,4'-biphenylene and A is —COO—).

Examples 1EP–18EP

MATERIALS:

Poly(methylhydrosiloxane)(PHMS)(M=1700–1900) and platinum-divinyltetramethyldisiloxane complex in xylene were purchased from Gelest, Inc., USA. PHMS was purified by dissolution in benzene and precipitation in methanol. Toluene used in the hydrosiliation reaction was first refluxed over sodium and then distilled under nitrogen. The synthesis of liquid crystalline polysiloxanes is outlined in Scheme 4 above.

GENERAL SYNTHESIS PROCEDURE:

The alkene 14E (0.59 g, 1.1 mmol, 10 mole % excess over the Si—H groups present in PHMS) was dissolved in toulene (60 ml) together with the PHMS (0.06 g, 1 mmol). The reaction mixture was heated to 110° C. and divinyltetramethyldisiloxane platinum catalyst solution (alkene:Pt molar ratio of $10^3$:1) was then injected with a syringe. The reaction mixture was refluxed under nitrogen until both IR and $^1$H NMR analysis showed that the hydrosiliation reaction was complete. After 24 hours 1-nonene (0.2 g) was added to complete this reaction.

At the end of the reaction, the solvent was evaporated to 5 ml, and the reaction mixture was cooled. Methanol (50 ml) was then poured into the reaction mixture slowly with stirring. The precipitated polymer was collected by centrifugation at 3000 rpm for 15 minutes. The separated liquid was decanted and the resulting white polymer was dissolved in dichloromethane and precipitated again using methanol. This process was repeated five times, and finally the polymer was dried at 40° C. under vacuum overnight.

Using this procedure, side chain liquid crystalline polysiloxanes (P) Examples 1EP to 18EP of formula (II) were prepared from corresponding alkenes 1E to 18E, which are listed in Table 2. Also the co-polysiloxanes (CP), Examples 19ECP to 23ECP were prepared from various alkenes as shown in Table 2.

Preparation of fused silica capillary columns:

Polymers of examples 1EP to 18EP and 19ECP to 23ECP may be used as stationary phases in fused silica capillary columns. Fused silica capillary columns were made with polymers 19ECP to 23ECP using the static coating method. In a typical procedure, fused silica capillary tubing purchased from Polymicro Technologies (USA) was washed by passing toluene (3× the volume of tubing), then flushed with helium for 2 hrs. at room temperature, and then heated in oven at about 200° C. while helium was continuously passed through the tubing.

The washed and dried tubing was coated with the liquid crystalline polysiloxane stationary phase. The procedure involved preparation of a stationary phase solution of concentration of about 3.2 mg/ml in methylene chloride and filling the tubing with the stationary phase solution to provide film thickness of about 0.2 μm. The coated columns were then heated at a rate of 3° C./min from 40° C. to about 20° C. below the upper transition temperature of the liquid crystal phase. The columns were then conditioned at the final temperature for 8 hours prior to standard efficiency and separation tests.

To prepare the columns with immobilized stationary phases, the stationary phase solution was spiked with 1 to 4% of a cross-linking agent, such as AIBN or peroxides.

In the Figures of the present application, the use of a liquid crystal column made from the liquid crystalline stationary phases of the present invention is illustrated.

Figure 1:
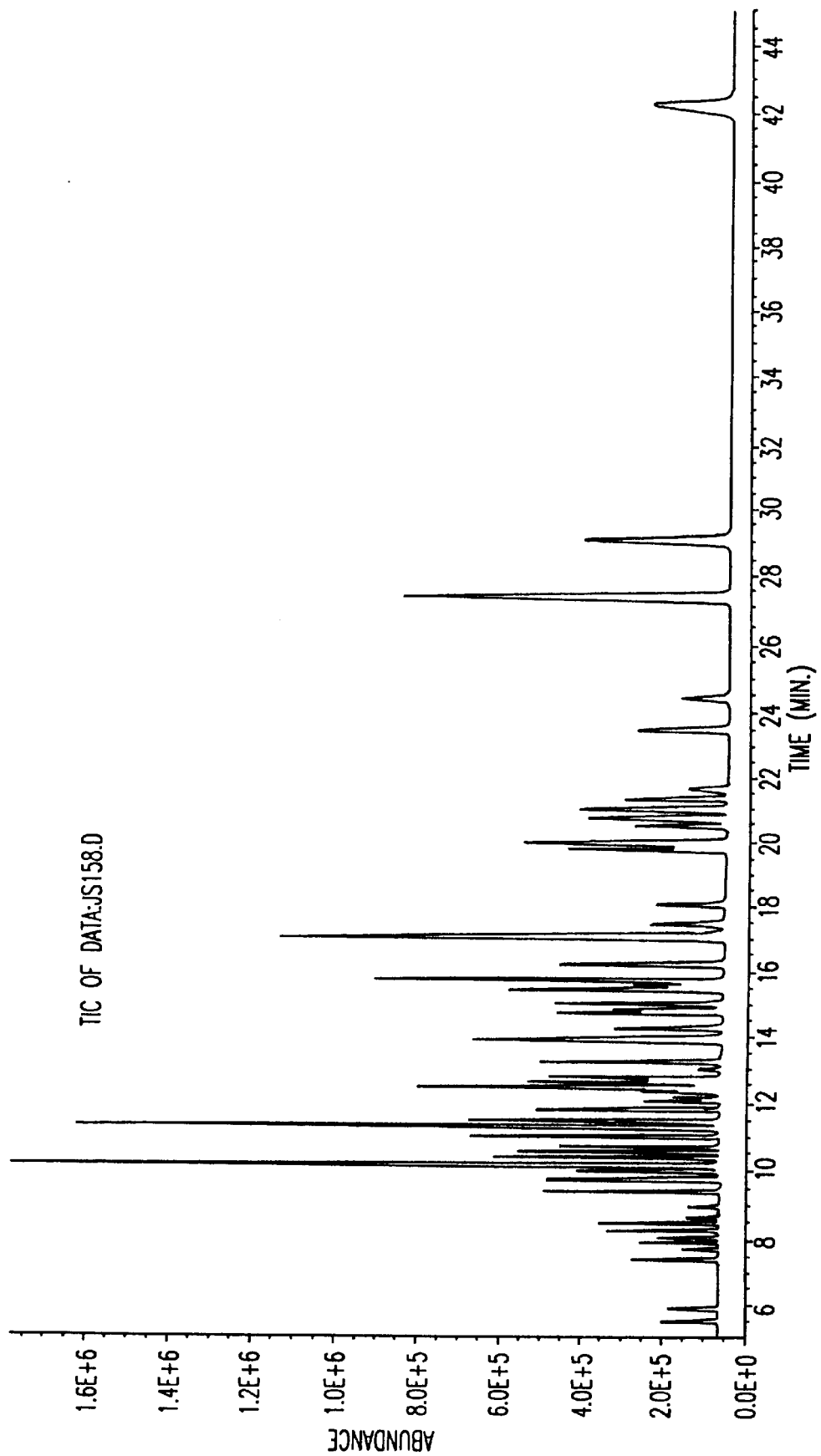
FIG. 1. Total ion chromatograms of polychlorinated dibenzo-p-dioxins on a column made using the stationary phase made in accordance with the present invention.

FIG. 1 illustrates the separation and analysis of polychlorinated dibenzo-p-dioxins in less than one hour. It also shows the application of liquid crystal column in GC-MS, the instrumentation generally used for analysis of PCDD.

FIG. 2 illustrates that the column is useful for the separation of the most toxic isomer, 2,3,7,8-TCDD from all other TCDD isomers. The selectivity of the column is unique for the separation of 2,3,7,8-TCDD where it elutes as a last but second peak. Thus, FIGS. 1 and 2 show successful analysis of the total amount of PCDD and the analysis of the most toxic isomer, 2,3,7,8-TCDD, in the presence of polychlorinated biphenyls. With known polysiloxane stationary phases, PCBs cause severe interference in GC/MS analysis of dioxins because they co-elute with the compound(s) of interest.

FIG. 3 shows the separation of 2,3,7,8-TCDD/TCDF from polychlorinated biphenyls (Aroclor 1260) on a column with the liquid crystal stationary phases of the present invention. From FIGS. 1, 2 and 3, it will be appreciated that the liquid crystal columns of the present invention provide an easy and fast method for the analyses of total PCDD and 2,3,7,8-TCDD/TCDF in the presence of PCBs.

FIG. 4 illustrates the use of liquid crystal column for the separation of various polycyclic aromatic hydrocarbons compared to a known polysiloxane column of 30 m length. The selectivity of a column containing the inventive liquid crystalline compounds for structural isomers is much better than the known polymer column.

TABLE 1

Liquid crystalline alkenes of formula (I).

| | Example No. | a | b | R | Yield (%) |
|---|---|---|---|---|---|
| Ar = 2,6-naphthyl A = —COO— | | | | | |
| | 1E | 1 | 2 | —OCH$_2$CH$_3$ | 61 |
| | 2E | 2 | 2 | —OCH$_2$CH$_3$ | 66 |
| | 3E | 3 | 2 | —OCH$_2$CH$_3$ | 70 |
| | 4E | 4 | 2 | —OCH$_2$CH$_3$ | 70 |
| | 5E | 9 | 2 | —OCH$_2$CH$_3$ | 68 |
| | 6E | 1 | 1 | —OCH$_2$CH$_3$ | 64 |
| | 7E | 2 | 1 | —OCH$_2$CH$_3$ | 63 |
| | 8E | 3 | 1 | —OCH$_2$CH$_3$ | 58 |
| | 9E | 4 | 1 | —OCH$_2$CH$_3$ | 60 |
| | 10E | 9 | 1 | —OCH$_2$CH$_3$ | 61 |
| | 11E | 1 | 2 | —COOCH$_2$CH(CH$_3$)CH$_2$CH$_3$ | 70 |
| | 12E | 2 | 2 | —COOCH$_2$CH(CH$_3$)CH$_2$CH$_3$ | 67 |
| | 13E | 3 | 2 | —COOCH$_2$CH(CH$_3$)CH$_2$CH$_3$ | 75 |
| | 14E | 4 | 2 | —COOCH$_2$CH(CH$_3$)CH$_2$CH$_3$ | 53 |
| | 15E | 9 | 2 | —COOCH$_2$CH(CH$_3$)CH$_2$CH$_3$ | 68 |
| Ar = 2,6-naphthyl A = —OOC— | | | | | |
| | 16E | 4 | 2 | —OCH$_2$CH$_3$ | 74 |
| | 17E | 4 | 1 | —OCH$_2$CH$_3$ | 62 |
| Ar = 4,4'-biphenylene A = —COO— | | | | | |
| | 18E | 2 | 1 | —OCH$_2$CH$_3$ | 71 |

TABLE 2

List of alkenes and corresponding polysiloxanes made from those alkenes, and their Phase Transition Temperatures.

| Alkenes | Phase Transition Temperatures (°C.) | Polysiloxane | Phase Transition Temperatures (°C.) |
|---|---|---|---|
| 1E | 160–230 | 1EP | 145–332 |
| 2E | 163–310 | 2EP | 145–335 |
| 3E | 155–295 | 3EP | 155–315 |
| 4E | 143–280 | 4EP | 140–320 |
| 5E | 120–215 | 5EP | 120–268 |
| 6E | 120–158 | 6EP | 92–85 |

TABLE 2-continued

List of alkenes and corresponding polysiloxanes made from those alkenes, and their Phase Transition Temperatures.

| Alkenes | Phase Transition Temperatures (°C.) | Polysiloxane | Phase Transition Temperatures (°C.) |
|---|---|---|---|
| 7E | 125–150 | 7EP | 90–195 |
| 8E | 85–152 | 8EP | 87–190 |
| 9E | 90–140 | 9EP | 88–192 |
| 10E | 70–120 | 10EP | 80–185 |
| 11E | 120–203 | 11EP | 140–255 |
| 12E | 138–233 | 12EP | 140–302 |
| 13E | 132–231 | 13EP | 140–300 |
| 14E | 138–215 | 14EP | 140–292 |
| 15E | 80–185 | 15EP | 90–255 |
| 16E | 130–290 | 16EP | 140–330 |
| 17E | 80–151 | 17EP | 75–203 |
| 18E | 147–240 | 18EP | 115–295 |
| 1E/6E (50:50 Mol %) | | 19ECP | 110–275 |
| 2E/7E (50:50 Mol %) | | 20ECP | 90–260 |
| 4E/9E (50:50 Mol %) | | 21ECP | 102–247 |
| 4E/14E (50:50 Mol %) | | 22ECP | 140–303 |
| 18E/4E (75:25 Mol %) | | 23ECP | 105–300 |

What is claimed is:

1. A stationary phase for column chromatography comprising:

(a) a layer of a liquid crystal polysiloxane of the formula (II):

Formula (II)

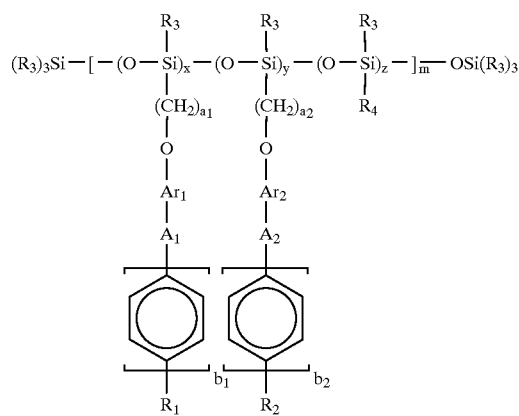

wherein:

$Ar_1$ and $Ar_2$ are each independently 2,6-naphthyl or 4,4'-diphenylene;

$A_1$ and $A_2$ are each independently —COO— or —OOC—;

$a_1$ and $a_2$ are each independently an integer of from 3 to 12:

$b_1$ and $b_2$ are each independently an integer of 1 or 2;

$R_1$ and $R_2$ are each independently any group which maintains the liquid crystalline properties of the resultant compound;

each $R_3$ is independently n-alkyl having from 1 to 18 carbon atoms phenyl or 4,4'-diphenylene;

$R_4$ is n-alkyl having from 1 to 18 carbon atoms phenyl or 4,4'-diphenylene;

m is an integer of from 10 to 200; and x, y and z are each an integer of from 10 to 100, such that x+y+z=m; provided that $Ar_1$ and $Ar_2$ are not both 4,4'-diphenylene when $A_1$ and $A_2$ are both —COO; and (b) a substrate having at least one surface, wherein said layer of a liquid crystal polysiloxane of Formula (II) is coated on at least one surface of said substrate.

2. The stationary phase for column chromatography of claim 1, wherein said liquid crystal polysiloxane of Formula (II) has a phase transition temperature of from about 0° C. to about 332° C.

3. The stationary phase of claim 1, wherein said substrate is a capillary tube adapted for use in chromatography.

4. The stationary phase of claim 1, wherein said substrate is a plurality of particles adapted for use as column packing in chromatography, each of said particles having a layer of said polysiloxane.

5. The stationary phase of claim 3 or 4, wherein said polysiloxane in said layer is cross-linked.

6. The stationary phase of claim 1, wherein each $R_3$ is methyl or phenyl.

7. The stationary phase of claim 6, wherein each $R_3$ is methyl and $R_4$ is n-alkyl.

8. The stationary phase of claim 1, wherein $R_1$ and $R_2$ are each independently alkyl having from 1 to 12 carbon atoms, alkoxy having 1 to 12 carbon atoms, or carboxyalkyl having 2 to 13 carbon atoms.

9. The stationary phase of claim 8, wherein $R_1$ and $R_2$ are the same and each is alkoxy or carboxyalkyl.

10. The stationary phase of claim 1, wherein $A_1$ and $A_2$ are the same.

11. The stationary phase of claim 10, wherein $Ar_1$ and $Ar_2$ are each 2,6-naphthyl.

12. The stationary phase of claim 1, wherein $A_1$ and $A_2$ are different.

13. The stationary phase of claim 12, wherein $Ar_1$ and $Ar_2$ are each 2,6-naphthyl.

14. The stationary phase of claim 1, wherein $Ar_1$ and $Ar_2$ are different.

* * * * *